G. GRIESCHE.
STONE SAW AND FEEDER.
APPLICATION FILED MAR. 14, 1917.

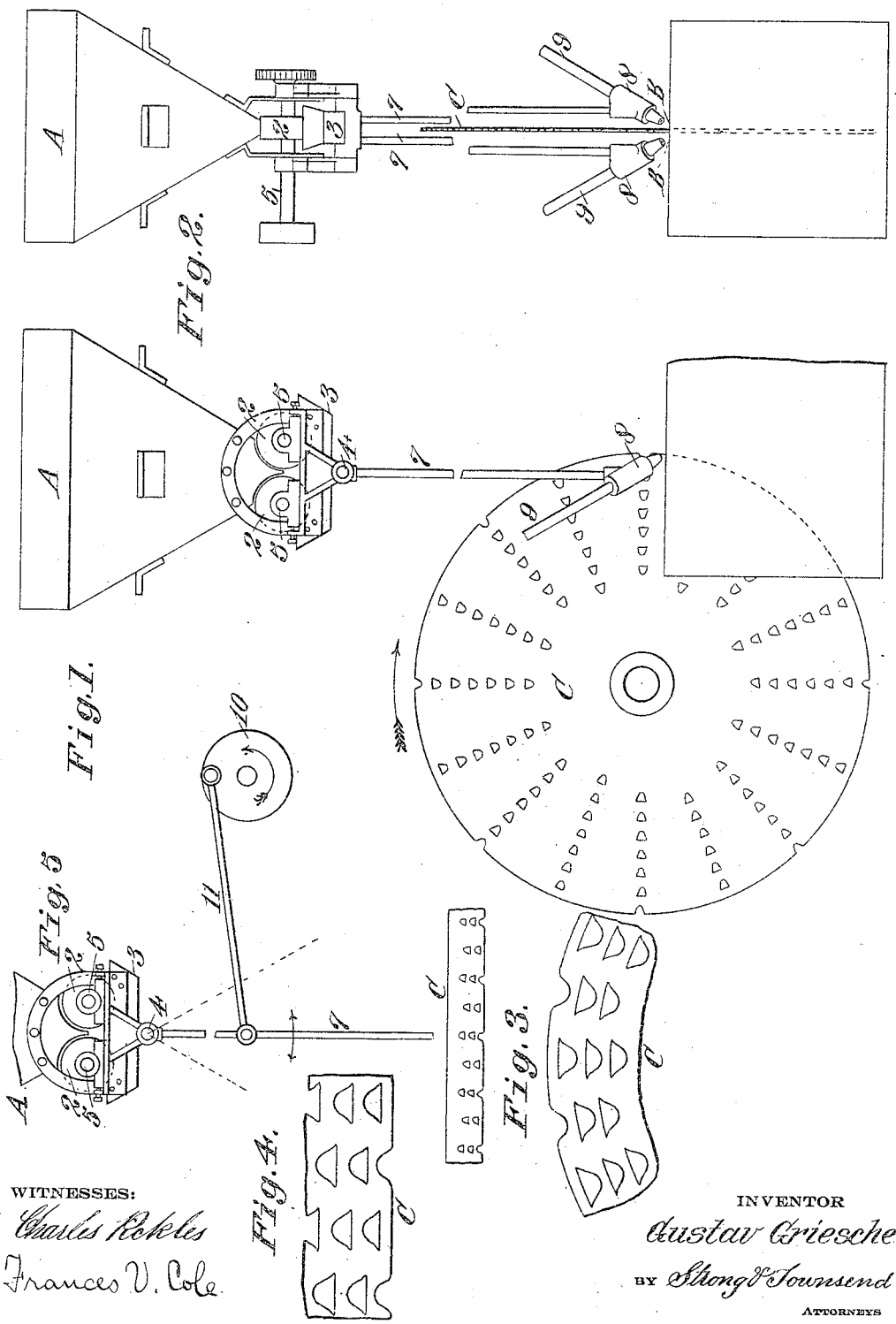

1,256,684.

Patented Feb. 19, 1918.
2 SHEETS—SHEET 2.

WITNESSES:
Charles Pickles
Frances V. Cole

INVENTOR
Gustav Griesche
BY Strong & Townsend
ATTORNEYS

UNITED STATES PATENT OFFICE.

GUSTAV GRIESCHE, OF BERKELEY, CALIFORNIA.

STONE SAW AND FEEDER.

1,256,684. Specification of Letters Patent. Patented Feb. 19, 1918.

Application filed March 14, 1917. Serial No. 154,705.

*To all whom it may concern:*

Be it known that I, GUSTAV GRIESCHE, a citizen of the United States, residing at Berkeley, in the county of Alameda and State of California, have invented new and useful Improvements in Stone Saws and Feeders, of which the following is a specification.

My invention relates to improvements in that class of apparatus in which granite, stone and like substances are cut by the abrasive action of a saw of suitable character, in conjunction with the abrasive substance interposed between the saw and the material to be cut.

The invention consists in the novel device, whereby the abrasive material may be delivered into contact with and between the surface to be cut and the saw which may either be of a circular, rotary, or reciprocating character.

The invention consists of the novel means for delivering the abrasive material to the saw, and in details of construction of the saw and feed, which will be more fully explained by reference to the accompanying drawings, in which—

Figure 1 is a view of the apparatus, presenting an end view of the feed rolls and a side view of a saw showing its application and construction.

Fig. 2 is a similar view, showing a side view of the feed apparatus and an edge view of a saw.

Fig. 3 is an enlarged view of a segment of a circular saw to which the feed may be applied.

Fig. 4 is a similar segment in a reciprocating saw.

Fig. 5 is an end view of the feed rolls and hopper, showing an oscillating attachment for the same.

Figure 6:
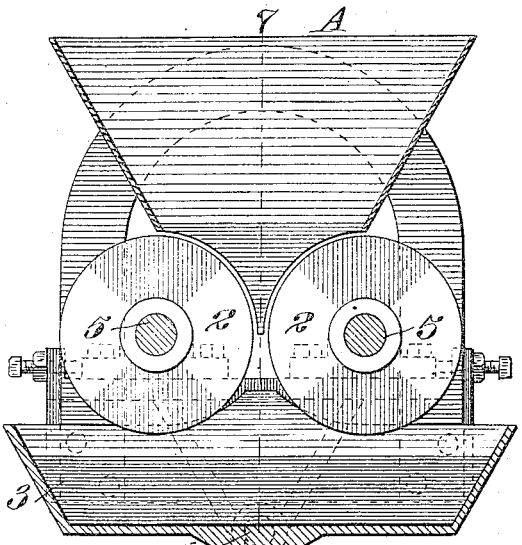
Fig. 6 is an enlarged, transverse section of the feed rolls and hopper, taken through the line 6—6 of Fig. 7.
Figure 7:
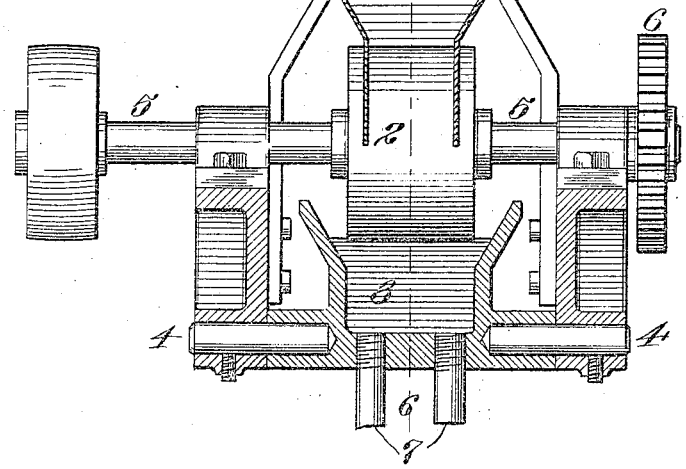
Fig. 7 is a section taken through the line 7—7 of Fig. 6.

For cutting of granite, stone and like material it is customary to employ either reciprocating or circular rotary saws which are driven in contact with the surface to be cut and, in conjunction therewith, an abrasive material is supplied between the contacting parts to assist in the more rapid cutting of the stone.

In the present case I have shown a receptacle A, adapted to contain abrasive material and from which the material may be delivered, as desired, at the point of contact B where the abrasion is to take place between the saw C and the surface to be cut.

In order to properly deliver this material I have shown a pair of rollers 2 journaled beneath the open contracted end of the hopper A and with their peripheries at such a distance apart as will serve to direct the abrasive material which is delivered from the hopper above into channels, whereby it is conducted to the surface to be cut. Passing below these feed rolls the material is received in a hopper-like receptacle 3, which is shown mounted upon trunnions 4 about which it is capable of oscillation. The feed rolls 2 are mounted upon shafts 5, and may be driven by power communicated through one of the shafts and they are rotated in unison by means of intermeshing gears 6. From the receiving hopper 3 conductors 7 extend downwardly to the point of delivery where the abrasive material can be discharged through nozzles 8, which I have here shown as directing the abrasive material to the point where the saw contacts with the material to be cut. Jets of water are supplied through these nozzles from conducting pipes 9.

In Fig. 5 I have shown a means for oscillating the hopper 3 about its trunnions 4, which, in the present case, is illustrated by a crank wheel 10 and a connecting rod 11, between said crank wheel and the conducting pipe 7, or some equivalent thereof which will cause these conductors to swing with relation to the saw C and thus extend the distribution of the abrasive material.

The saw employed may be of any desired description, either circular or reciprocating. In the present case I have shown the saw C having perforations made through the blade, these perforations in the circular saw being in radial lines from the periphery toward the center and each alternate line of perforations is in circles of the same diameter while the other alternate lines of perforations are in circles which are between the first-named circles. The effect of this is that when the periphery of the saw is worn to a point where one circle of perforations is presented at the edge of the saw they form pockets into which the abrasive material may be packed and by which it is held in contact with the surface of the stone while the saw is in operation. When the circle of the saw has been worn and before the first-named perforations have been effaced from it, the next set of perforations will be exposed at the edge of the saw and will thus form another line of pockets for the reception of the abrasive material, and in this manner the saw is made effective until worn out.

It will be understood that this same arrangement of perforations may be applied to a reciprocating saw with equally good effect, such an application being shown in Fig. 5.

Having thus described my invention, what I claim and desire to secure by Letters Patent is—

1. In a stone sawing machine, a saw, a feed hopper, a duct leading from the hopper and discharging at a side of the saw in a plane substantially parallel to the plane of the saw, and means to oscillate said duct in a plane substantially parallel to the plane of the saw.

2. In a stone sawing machine, a saw, a feed hopper, a pair of spaced ducts leading from the hopper and discharging at the respective opposite sides of the saw and each arranged in a plane substantially parallel to the plane of the saw, and means to oscillate said ducts in a plane substantially parallel to the plane of the saw.

3. In a stone sawing machine, a saw, a delivery receptacle having a discharge, feed rolls arranged in said discharge, a hopper arranged to receive the abrasive material from said rolls, a pair of spaced trunnions connected to said receptacle, said hopper being mounted between said trunnions and supported by the latter for oscillating movement, a pair of ducts leading from the hopper and arranged on the opposite sides of the saw and in a plane substantially parallel to the plane of the saw, and means to oscillate the ducts in a plane substantially parallel to the plane of the saw.

4. In a stone sawing machine, a saw, a pair of feed rolls, means to rotate the rolls, means to feed abrasive material to the feed rolls, an oscillatory hopper arranged to receive the material from said rolls, a duct leading from said hopper and arranged to discharge against a side of the saw, and means to oscillate the duct in a plane substantially parallel to the plane of the saw.

5. In a stone sawing machine, a saw, a feed hopper, a duct leading from the feed hopper and extending on a side of the saw in a plane substantially parallel to the plane of the saw, a nozzle connected to said duct to discharge against a side of the saw, and a water supply pipe connected to the nozzle.

6. In a stone sawing machine, a saw, a pair of rotatable feed rolls, a hopper arranged beneath said feed rolls, means to mount said hopper for oscillatory movement, said hopper being formed so as to receive the abrasive material from the feed rolls in all positions of the hopper, a duct leading from the hopper to the saw, and means to oscillate the hopper.

In testimony whereof I have hereunto set my hand in the presence of two subscribing witnesses.

GUSTAV GRIESCHE.

Witnesses:
W. W. HEALEY,
M. E. EWING.

Copies of this patent may be obtained for five cents each, by addressing the "Commissioner of Patents, Washington, D. C."